United States Patent
Föhl

[11] Patent Number: 5,941,131
[45] Date of Patent: Aug. 24, 1999

[54] ATTACHMENT DEVICE FOR A VEHICLE STEERING WHEEL

[75] Inventor: Artur Föhl, Schorndorf, Germany

[73] Assignee: TRW Repa GmbH, Alfdorf, Germany

[21] Appl. No.: 09/039,043

[22] Filed: Mar. 13, 1998

Related U.S. Application Data

[62] Division of application No. 08/866,902, May 30, 1997, Pat. No. 5,816,113, which is a continuation of application No. 08/445,422, May 19, 1995, abandoned.

[30] Foreign Application Priority Data

May 31, 1994 [DE] Germany ................... 4419078

[51] Int. Cl.⁶ ............... B62D 1/04; B25G 3/00
[52] U.S. Cl. ............ 74/552; 403/319; 403/539; 403/259
[58] Field of Search .......... 74/552; 403/319, 403/359, 259

[56] References Cited

U.S. PATENT DOCUMENTS

| | | |
|---|---|---|
| 2,448,278 | 8/1948 | Ronning ................... 403/359 |
| 4,402,236 | 9/1983 | Nishikawa . |
| 4,418,582 | 12/1983 | Martin . |
| 4,624,596 | 11/1986 | Eckendorff . |
| 4,628,758 | 12/1986 | Yuzuriha . |
| 4,662,775 | 5/1987 | Faul . |
| 4,674,354 | 6/1987 | Brand . |
| 4,721,008 | 1/1988 | Stoops et al. . |
| 4,728,218 | 3/1988 | Durham . |
| 4,771,650 | 9/1988 | Kerner ................... 74/498 |
| 4,828,286 | 5/1989 | Fohl . |
| 4,840,078 | 6/1989 | Shitanoki . |
| 4,938,094 | 7/1990 | Cochard . |
| 5,144,861 | 9/1992 | Nishijima et al. . |
| 5,398,568 | 3/1995 | Worrell et al. . |
| 5,536,106 | 7/1996 | Landis et al. . |
| 5,718,151 | 2/1998 | Parrish et al. ............ 74/552 |
| 5,832,787 | 11/1998 | Heilig ................... 74/552 |

FOREIGN PATENT DOCUMENTS

| | | |
|---|---|---|
| 0475183 A1 | 3/1992 | European Pat. Off. ........ 74/552 |
| 2715906 | 8/1995 | France . |
| 921902 | 12/1954 | Germany . |
| 2901024 | 7/1980 | Germany . |
| 4013810 | 10/1991 | Germany . |
| 4130251 | 3/1993 | Germany . |
| 191223 | 1/1923 | United Kingdom . |
| 655837 | 8/1951 | United Kingdom . |
| 1189798 | 4/1970 | United Kingdom . |

Primary Examiner—Vinh T. Luong
Attorney, Agent, or Firm—Tarolli, Sundheim, Covell, Tummino & Szabo

[57] ABSTRACT

A device for attaching a steering wheel on a steering shaft by a connecting sleeve, which is attached to the hub of the steering wheel. At its end, the steering shaft has a section with exterior splines, which are complementary to interior splines in the connecting sleeve. The connecting sleeve has an axial slot and is clamped by a clamping screw against the section of the steering shaft which has the splines. The steering wheel constitutes a sub-assembly with an integrated air bag module and may be supplied for the final assembly of the vehicle.

5 Claims, 2 Drawing Sheets

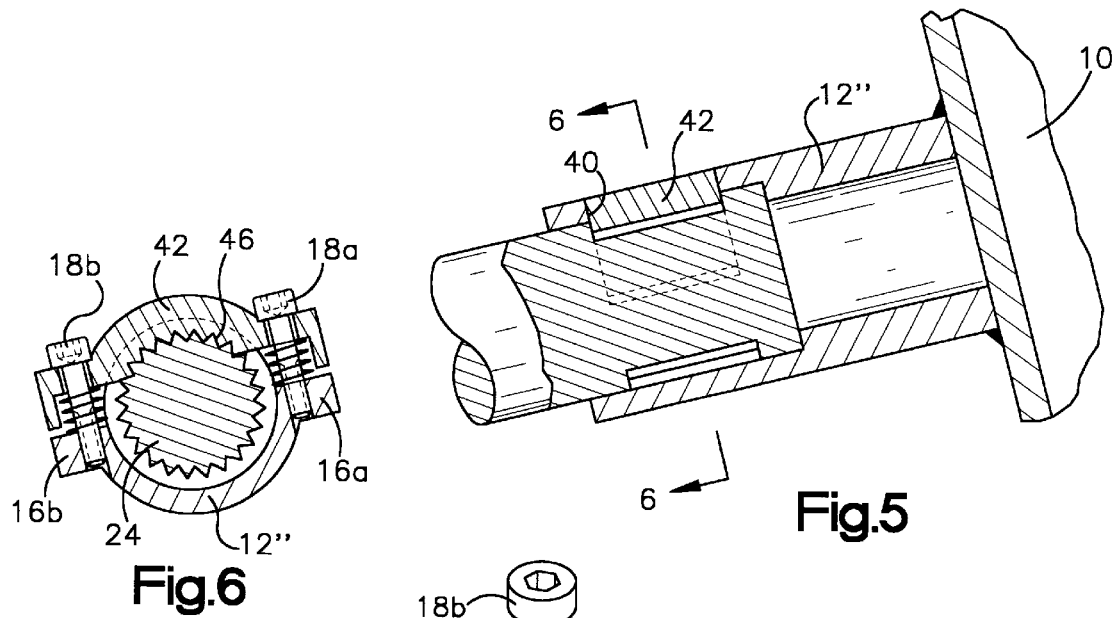
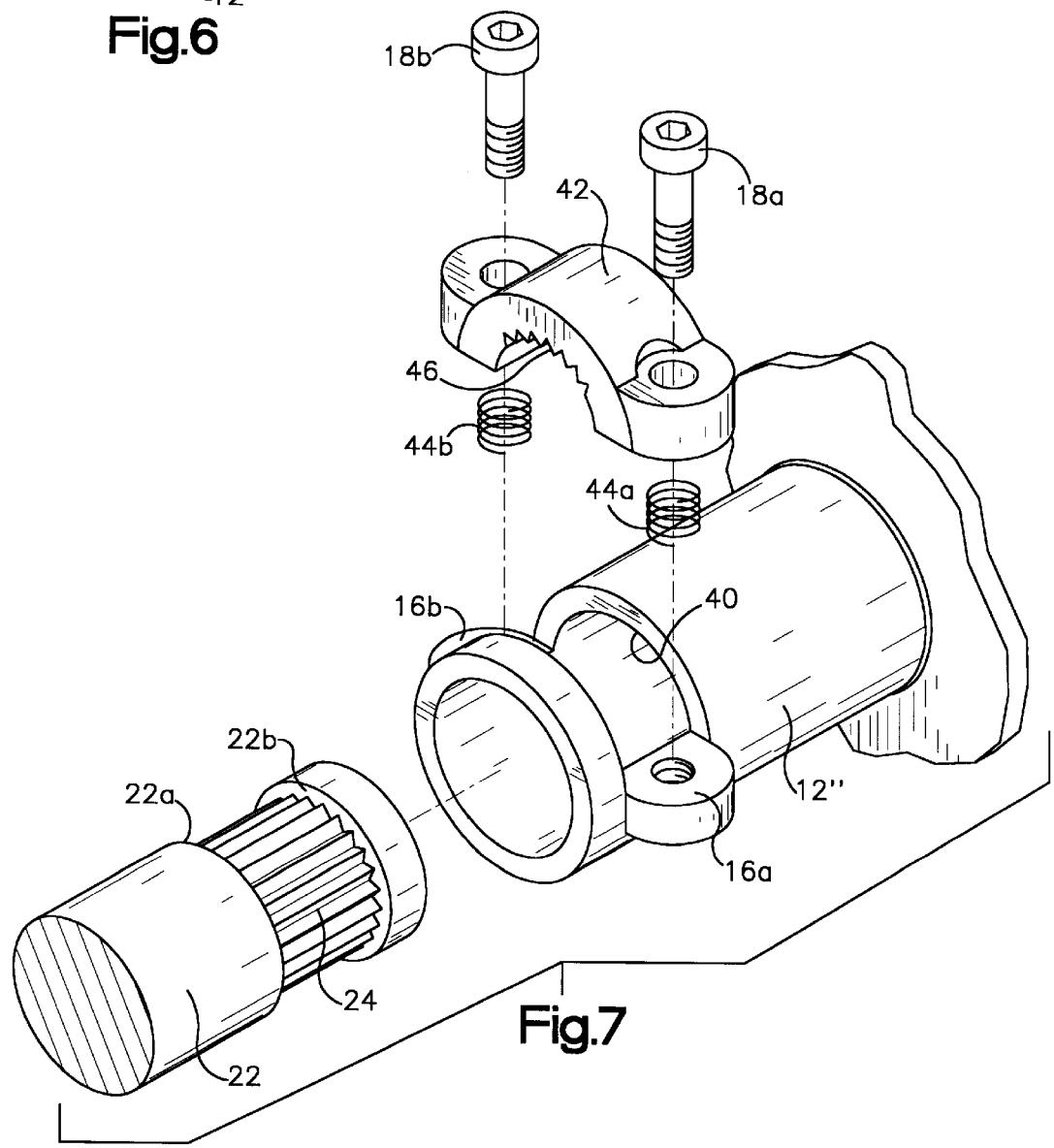

ATTACHMENT DEVICE FOR A VEHICLE STEERING WHEEL

This is a division of application Ser. No. 08/866,902, filed May 30, 1997, now U.S. Pat. No. 5,816,113 issued on Oct. 6, 1998, which is a continuation of application Ser. No. 08/445,422 filed on May 19, 1995, now abandoned.

BACKGROUND OF THE INVENTION

The invention relates to an attachment device for a vehicle steering wheel in the case of which a connection adapted to prevent relative rotation between the steering wheel and the steering shaft is produced by means of interlocking splines.

In addition to the connection preventing relative rotation between the steering shaft and the steering wheel, means is required for axial location or locking of these vehicle components. The axial locking action, which is in accordance with the state of the art, is achieved using a nut, which is screwed on the free end of the is steering shaft. This type of attachment of the steering wheel is intended to meet the need during final assembly operations on the vehicle and after conclusion of the setting of the geometry of the steering system to be able to readily remove the steering wheel from the steering shaft for the compensation of all cumulative tolerances and to slip the same onto the shaft in the correct angular setting, since the nut may be released and then tightened again with only a few movements of the hand. A correction of the angular setting of the steering wheel is furthermore necessary after resetting of the steering system geometry. Since the conventional steering wheel attachment means has come to be accepted as regards reliability, simplicity and the convenient possibility of dismounting the steering wheel, such system is adhered to, although in some aspects it has disadvantages.

Vehicles are, on an ever increasing scale, being fitted with gas bag occupant restraining systems. On the driver's side, the air bag is customarily integrated in the steering wheel with a pyrotechnic gas generator. During fitting of the steering wheel, the so-called air bag module may only be installed after completion of the attachment on the steering shaft. Although systems with an annular gas generator and a toroidal gas bag have been proposed (see U.S. Pat. No. 4,828,286), the toroidal configuration of the gas bag limits the freedom of design when optimizing the system.

SUMMARY OF THE INVENTION

The invention provides an attachment device for a vehicle steering wheel, which to the same degree as a conventional attached device renders possible easy dismounting of the steering wheel, without however necessitating a nut for locking the steering wheel on the shaft in the axial direction so that completely preassembled units comprising a steering wheel and the integrated air bag module may be supplied and employed for final assembly. This is rendered possible, in accordance with the invention, because the steering wheel and the steering shaft are locked together, as regards the direction of their common axis, by urging the splines against each other transversely in relation to said axis. For the attachment of the steering wheel, it is therefore unnecessary to provide access to the interior of the steering wheel hub. The clamping of the splines transversely to the common axis of the steering wheel and the steering shaft is preferably ensured by means of clamping screws, which may be tightened and released with a tool placed athwart such axis.

In accordance with a first aspect of the invention, a connecting sleeve having at least one axial slot is attached, by welding for instance, to the hub of the steering wheel. The interior of the sleeve is provided with splines. The sleeve is placed exteriorly on the end of the steering shaft which is provided with mating splines. This design is characterized by simplicity and the possibility of low-cost manufacture.

In accordance with a second aspect of the invention, a connecting sleeve is attached to the hub of the steering wheel and has a cutout in a direction across its axis wherein a clamping yoke fits. The interior of the clamping yoke is provided with one of the sets of splines. The end of the steering shaft, which is provided exteriorly with the other set of splines, is inserted into the connecting sleeve. The clamping yoke is attached by means of two clamping screws on the connecting sleeve and is clamped or urged against the splines at the end of the steering shaft. In order to move the steering wheel into a different angular setting on the steering shaft, it is merely necessary to release the clamping screws by turning them a few turns so that the splines may be disengaged from one another. The steering wheel may then be turned without being removed from the steering shaft. Once the steering wheel is located in the correct angular setting, the clamping screws are tightened again.

BRIEF DESCRIPTION OF THE DRAWINGS

Further features of the present invention will become apparent to those skilled in the art to which the present invention relates from reading the following description with reference to the accompanying drawings, in which:

FIG. 5 shows an axial section taken through another embodiment of the attachment device;

FIG. 6 is a section view taken on the line VI—VI of FIG. 5; and

FIG. 7 depicts a diagrammatic exploded view of the attachment device according to FIGS. 5 and 6.

DESCRIPTION OF PREFERRED EMBODIMENT

Figure 1:
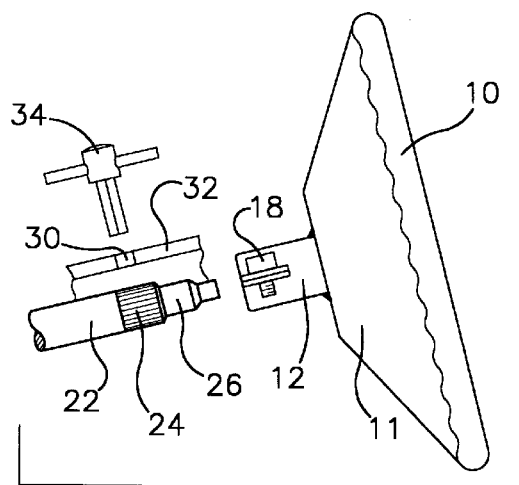
FIG. 1 is a diagrammatical lateral elevation of a steering wheel prior to mounting on the end of a steering shaft.
Figure 2:
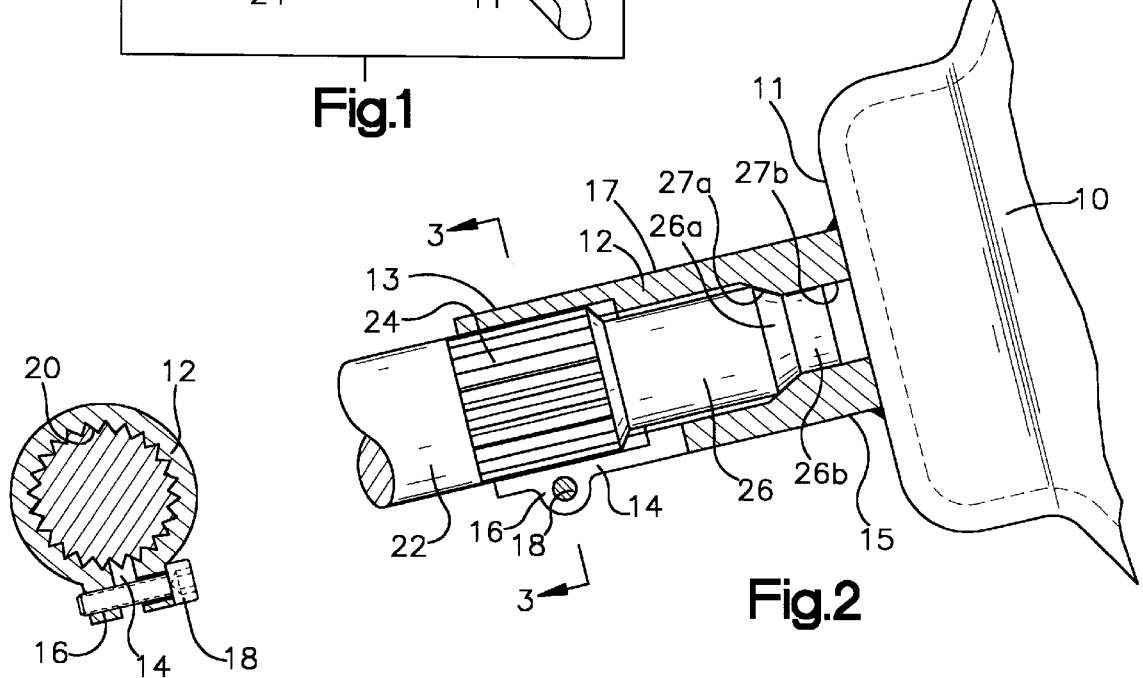
FIG. 2 shows an axial sectional view of the attachment device for the vehicle steering wheel.
Figure 3:
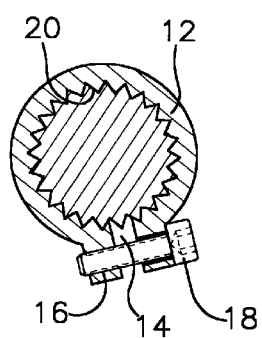
FIG. 3 is a section taken on the line III—III of FIG. 2.

In the case of the embodiment illustrated in FIGS. 1, 2 and 3, a connecting sleeve 12 is welded to the bottom of the hub 11 of a steering wheel 10. On it side or end 13 remote from the steering wheel 10, the connecting sleeve 12 is provided with an axial slot 14. Two flange-like lugs 16 are formed opposite to each other at the edges of the slot 14, one lug 16 having a plain through hole and the other one having a screw threaded hole in alignment therewith for a tightening screw 18. The connecting sleeve 12 is, on its inner side and at its end 13 remote from the steering wheel 10, provided with a set of splines 20. A corresponding, exterior set of splines is located at the free end of a steering shaft 22 at a section 24 thereof, which is between the steering shaft and a centering tail 26. The centering tail 26 possesses a conical shoulder 26a, (i.e., a tapered end portion which extends radially inward along a longitudinal central axis of the shaft 22) and at the free end it has a centering pin 26b. The connecting sleeve 12 includes an intermediate portion 17 adjacent its end 15 adjacent to the steering wheel 10. The intermediate portion 17 includes a tapered interior surface 27a which extends radially inward as the interior surface 27a extends along a longitudinal central axis of the sleeve 12 to correspond to the conical shoulder 26a. The intermediate portion 17 also includes a cylindrical surface 27b which corresponds to the centering pin 26b. The end 15 of the connecting sleeve 12 comprises a first end of the sleeve and the end 13 of the sleeve comprises a second open end of the sleeve.

Preferably, with an integrated air bag module (not illustrated), the steering wheel 10 constitutes a complete sub-assembly or preassembled unit for a vehicle and is supplied as such. During the final assembly of a vehicle, such unit is provided in a condition ready for fitting. The steering wheel 10 is brought into the correct angular setting and slipped onto the end of the steering shaft 22. A tool 34 is introduced through an opening 30 in a part 32 of the vehicle body in order to insert the clamping screw 18 and to tighten it, the axial gap 14 then being narrowed and the connecting sleeve 12 being secured by friction to the section 24, provided with the splines, of the steering wheel shaft 22. Any later necessary resetting of the angular setting of the steering wheel 10 may then take place without removing the air bag module, since after slackening off the clamping screw 18 the complete steering wheel sub-assembly can be pulled off the steering shaft 22, turned and mounted again.

Figure 4:
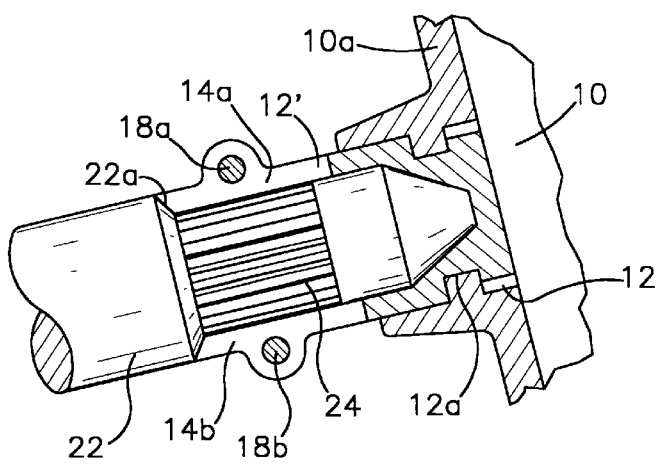
FIG. 4 is a sectional elevation of another embodiment of the attachment device.

The modified design depicted in FIG. 4 employs a connecting sleeve 12' with two axial slots 14a and 14b. Since the main body 10a of the steering wheel 10 is in the form of an injection casting, attachment of the connecting sleeve 12 by welding does not come into question. Instead, the connecting sleeve 12' is connected with the main body 10a of the steering wheel 10 in an interlocking manner by swaging. As shown in FIG. 4, the connecting sleeve 12' possesses an encircling groove 12a at its end adjacent to the steering wheel 10, and into such groove there is fitted a corresponding rib on the main body 10a. The connecting sleeve 12' furthermore has a knurled area 12b which is surrounded by a corresponding knurled area on the main body 10a. The steering shaft 22 is provided with an abutment shoulder 22a for the connecting sleeve 12' in order to accurately axially position the steering wheel on the steering shaft.

In the case of this embodiment of the invention, the attachment is by means of two diametrically opposite clamping screws 18a and 18b.

In the case of the embodiment according to FIGS. 5, 6 and 7, the connecting sleeve 12" is provided with a cutout 40 athwart the common axis of the steering wheel and the steering shaft. Opposite to flanges at the ends of the clamping yoke 42, there are correspondingly shaped lugs 16a and 16b on the connecting sleeve 12". These flange-like lugs 16a and 16b are respectively provided with a screw threaded hole, into which a respective clamping screw 18a or 18b is fitted, which extends through a corresponding through hole in one flange of the clamping yoke 42. Between the lugs 16a and 16b and the clamping yoke 42, a respective compression spring 44a and 44b is fitted so that the clamping yoke 42 is urged or biased radially away from the connecting sleeve 12".

The interior of the clamping yoke 42 is provided with splines 46. The connecting sleeve 12" is on the contrary not interiorly provided with splines.

At the free end of the steering shaft 22 a splined section 24 is provided between two encircling shoulders 22a and 22b.

For fitting the steering wheel, the connecting sleeve 12" is slipped over the end of the steering shaft 22. The clamping yoke 42 is already mounted, but however the clamping screws 18a and 18b are to be slackened off that the clamping yoke 42 does not extend into the interior of the connecting sleeve 12". The steering wheel is now moved into the correct axial position, in which the shoulders 22a and 22b at the end of the steering shaft 22 are in alignment with the edges of the cutout 40. After the steering wheel has been moved into the correct angular setting, it is possible for the clamping screws 18 and 18b to be tightened so that the clamping yoke 42 fits between the shoulders 22a and 22b and finally is clamped onto the section 24 of the steering shaft 22.

In this case of this design, the location of the correct axial position of the steering wheel on the steering shaft is facilitated in a manner similar to that indicated in FIG. 1, since suitable openings are provided in a fixed part of the vehicle for access with a tool.

From the above description of the invention, those skilled in the art will perceive improvements, changes and modifications. Such improvements, changes and modifications within the skill of the art are intended to be covered by the appended claims.

Having described the invention, I claim:

1. An attachment device for mounting a steering wheel on a steering shaft of a vehicle, said steering shaft having a splined end section and said device comprising a tubular sleeve having a first end connected to a hub portion of said steering wheel and a second, open end for accommodation of said steering shaft end section, said second sleeve end having a wall portion with a cutout extending in peripheral and axial directions of said sleeve, an internally splined clamping yoke fitting into said cutout, and clamping means for engaging said clamping yoke on said steering shaft end section in a direction transverse to said axial direction.

2. The attachment device of claim 1, wherein said sleeve and said clamping yoke have corresponding pairs of outwardly projecting flanges defining said cutout in the peripheral direction, and said clamping means comprises at least one pair of clamping screws extending through said flanges.

3. The attachment device of claim 1, wherein said splined steering shaft end section has a reduced diameter and is defined between a pair of axially spaced radial shoulders, said clamping yoke being engaged between said radial shoulders.

4. The attachment device of claim 1, wherein said hub portion is connected to said sleeve by injection casting and swaging said hub portion around said first sleeve end.

5. The attachment device of claim 1, wherein said steering shaft end section has a tapered end and said first sleeve end has a bottom portion shaped for fitting accommodation of said tapered shaft end.

* * * * *